(12) United States Patent
Li et al.

(10) Patent No.: US 6,304,748 B1
(45) Date of Patent: Oct. 16, 2001

(54) TRANSMITTER CIRCUITRY FOR A CELLULAR PHONE

(75) Inventors: Leo L. Li, Trabuco Canyon; Christopher M. Chorey, Newport Beach, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/158,876

(22) Filed: Sep. 23, 1998

(51) Int. Cl.[7] ............................................. H04B 1/04
(52) U.S. Cl. ............................ 455/113; 455/550; 455/91
(58) Field of Search ................................ 455/550, 95, 91, 455/113, 553, 552

(56) References Cited

U.S. PATENT DOCUMENTS

| | | | | |
|---|---|---|---|---|
| 5,291,516 | * | 3/1994 | Dixon et al. ........................... | 375/1 |
| 5,640,686 | * | 6/1997 | Norimatsu ............................. | 455/74 |
| 5,678,222 | * | 10/1997 | Hornak et al. ....................... | 455/319 |
| 5,915,212 | * | 6/1999 | Przelomiee et al. ................... | 455/83 |
| 5,983,081 | * | 11/1999 | Lehtinen ................................ | 455/76 |
| 6,023,611 | * | 2/2000 | Bolin et al. .......................... | 455/114 |
| 6,043,721 | * | 3/2000 | Nagode et al. ....................... | 332/117 |
| 6,049,702 | * | 4/2000 | Tham et al. .......................... | 455/78 |
| 6,078,794 | * | 6/2000 | Peckham et al. .................... | 455/127 |
| 6,091,966 | * | 7/2000 | Meadows ............................. | 455/114 |

* cited by examiner

*Primary Examiner*—Daniel Hunter
*Assistant Examiner*—C. Chow
(74) *Attorney, Agent, or Firm*—Knobbe, Martens, Olson & Bear, LLP.

(57) ABSTRACT

A cellular phone for a mobile communications system includes a dual band transmitter which operates at a first radio frequency band and a second radio frequency band. The dual band transmitter includes two amplifiers. The first amplifier has a first input for a first signal at the first radio frequency band, and a first output for an amplified first signal. The first output is connectable to the antenna via a first signal path. The second amplifier has a second input for a second signal at the second radio frequency band and a second output for an amplified second signal. The second output is connectable to the antenna via a second signal path. A filter module is associated with the first and second signal paths and configured to receive a control signal which controls the filter module to have one of a first and second cut-off frequencies.

17 Claims, 4 Drawing Sheets

TRANSMITTER CIRCUITRY FOR A CELLULAR PHONE

BACKGROUND OF THE INVENTION

The invention relates to a transmitter used in a communications systems. More particularly, the invention relates to a transmitter for a wireless phone, such as a cellular phone used in mobile communications systems.

An example for wireless phones are cellular phones which are designed to operate within the environment of one of several mobile communications networks. An exemplary environment is a mobile communications network according to a standard known as GSM (Global System for Mobile communications) created by the European Telecommunications Standards Institute (ETSI). In GSM, there is an assigned frequency band around 900 MHz for Standard GSM, and an assigned frequency band around 1800 MEz for DCS1800 (Digital Communications System, DCS). Other environments include systems known as Advanced Mobile Phone System (AMPS) operating in a frequency band around 800 MHz, and as Personal Communications System (PCS) operating in a frequency band around 1900 MHz.

As the number of users of cellular phones increases, some operators have added capacity to their networks by including more than only one frequency band in their networks. In the case of the GSM system, for example, the frequency bands around 900 MHz and 1800 MHz are now used to expand the capacities of certain networks.

Manufacturer of cellular phones, therefore, are developing a new generation of cellular phones which are operable at, for example, two frequency bands. A cellular phone operable at two frequency bands is referred to as a dual band cellular phone. As the dual band cellular phone has to transmit signals at both frequency bands, duplication of functions is required. Duplication of functions, however, leads to higher manufacturing costs and ultimately to higher prices for the dual band cellular phones.

SUMMARY OF THE INVENTION

There is therefore a need to keep the manufacturing costs caused by the duplication as low as possible. Further, there is a need to minimize size of dual band cellular phones because users have come to expect single band cellular phones to be small and to have an attractive design.

An aspect of the invention involves a transmitter comprising first and second amplifiers and a filter module. The first amplifier has a first input for a first signal at a first radio frequency band, and a first output for an amplified first signal. The first output is connectable to an antenna via a first signal path. The second amplifier has a second input for a second signal at a second radio frequency band and a second output for an amplified second signal. The second output is connectable to the antenna via a second signal path. The filter module is associated with the first and second signal paths and configured to receive a control signal which selectively operates the filter module at one of at least a first and second filter characteristics to selectively block undesired frequencies.

In one embodiment, the filter module filter module comprises a filter circuit and a switch controllable by the control signal. The filter circuit is configured to implement a first low pass filter when the switch is in a first switch state, and a second low pass filter when the switch is in a second switch state. Advantageously, the first and second low pass filters share filter components. The shared filter components include a combination of at least a capacitor and an inductor, and the switch selectively connects one of a first and second capacitors to this combination to form one of the first and second low pass filters.

Another aspect of the invention involves a wireless phone for a communications system. The phone is operable at a first radio frequency band and a second radio frequency band and includes such a transmitter.

A further aspect of the invention involves a cellular phone for a mobile communications system. The cellular phone is operable at a first radio frequency band and a second radio frequency band and includes a dual band transmitter. The dual band transmitter has first and second amplifiers and a filter module. The first amplifier has a first input for a first signal at a first radio frequency band, and a first output for an amplified first signal. The first output is connectable to an antenna via a first signal path. The second amplifier has a second input for a second signal at a second radio frequency band and a second output for an amplified second signal. The second output is connectable to the antenna via a second signal path. The filter module is associated with the first and second signal paths and configured to receive a control signal which selectively operates the filter module at one of a first and second filter characteristics to selectively block undesired frequencies.

Another aspect of the invention involves an amplifier module having first and second amplifiers and a filter module. The filter module is associated with first and second signal paths and configured to receive a control signal which selectively operates the filter module at one of at least a first and second filter characteristics to selectively block undesired frequencies.

A further aspect of the invention involves a method for filtering radio frequency signals in a wireless phone. The wireless phone includes a transmitter having a first amplifier configured to amplify signals at a first frequency band, and a second amplifier configured to amplify signals at a second frequency band. One of the first and second amplifiers is activated and a signal is fed to the activated amplifier. The activated amplifier amplifies the signal and feed the amplified signal to a filter module. The filter module has at least two filter characteristics defined for the first and second frequency bands. The filter module selects one of the at least two filter characteristics implemented in the filter module. The selected filter characteristic blocks undesired frequencies outside a frequency band of the signal fed to the activated amplifier. The filter module outputs the filtered signal to the antenna.

In one embodiment, the filter module includes a switch which operates between at least a first and second state to selectively add at least one filter element to a combination of shared filter elements in order to selectively implement the at least two filter characteristics.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION OF THE PREFERRED EMBODIMENT

The preferred embodiment of the invention is described with reference to a cellular phone for use in a mobile communications system. It is contemplated that the invention is equally applicable in other wireless devices such as conventional cordless phones for home or office use.

A mobile communications system, for example according to the GSM standard, is structured to have a variety of individual regions called cells, and to comprise a variety of fixed transceiver stations called base transceiver stations, and a plurality of mobile stations, the cellular phones. Usually, one base transceiver station defines one cell and handles telephone traffic to and from cellular phones which are currently located in the cell.

Figure 1:
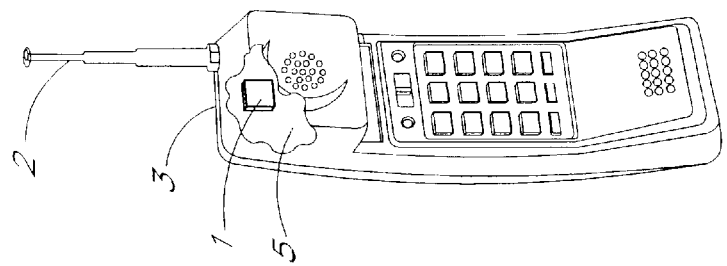
FIG. 1 is a schematic illustration of a cellular phone cut away to show a portion of the motherboard.

FIG. 1 schematically illustrates a cellular phone 3 made in accordance with the invention. Hereinafter, the cellular phone 3 is exemplary described as, but not limited to a dual band cellular phone. A portion of the case of the dual band cellular phone 3 is cut away to show a motherboard 5 of the cellular phone 3 with a transmitter 1 positioned thereon. Although not shown in FIG. 1, those skilled in the art will appreciate that the cellular phone 3 comprises a plurality of other components and functional modules, such as the components of a receive path and a transmit path. The cellular phone 3 further includes an antenna 2, a display and a keypad.

The receive path of such a dual band cellular phone 3 includes a radio frequency (RF) receiver, an analog-to-digital converter, a demultiplexer and a demodulator. The transmit path comprises a multiplexer, modulator, digital-to-analog converter and an RF transmitter. Further functional modules include, for example, a channel coder/decoder and a speech coder/decoder. Both the RF receiver and the RF transmitters are usually connected to the antenna 2 by means of an electronic switch 2a which connects the antenna 2 either to the RF receiver or to the RF transmitter.

The RF transmitter comprises an amplifier stage for amplifying the RF signals. according to electrical characteristics, for example, a defined power level versus time profile and a defined spectral mask, before the RF signals are fed to the antenna 2 and emitted as radio signals. The spectral mask and the power level versus time profile are defined in GSM Technical Specification GSM 05.05, July 1996, Version 5.2.0, entitled "Digital cellular telecommunications system (Phase 2+); Radio transmission and reception", Paragraph 4.2.2, and Annex B.

Figure 2:
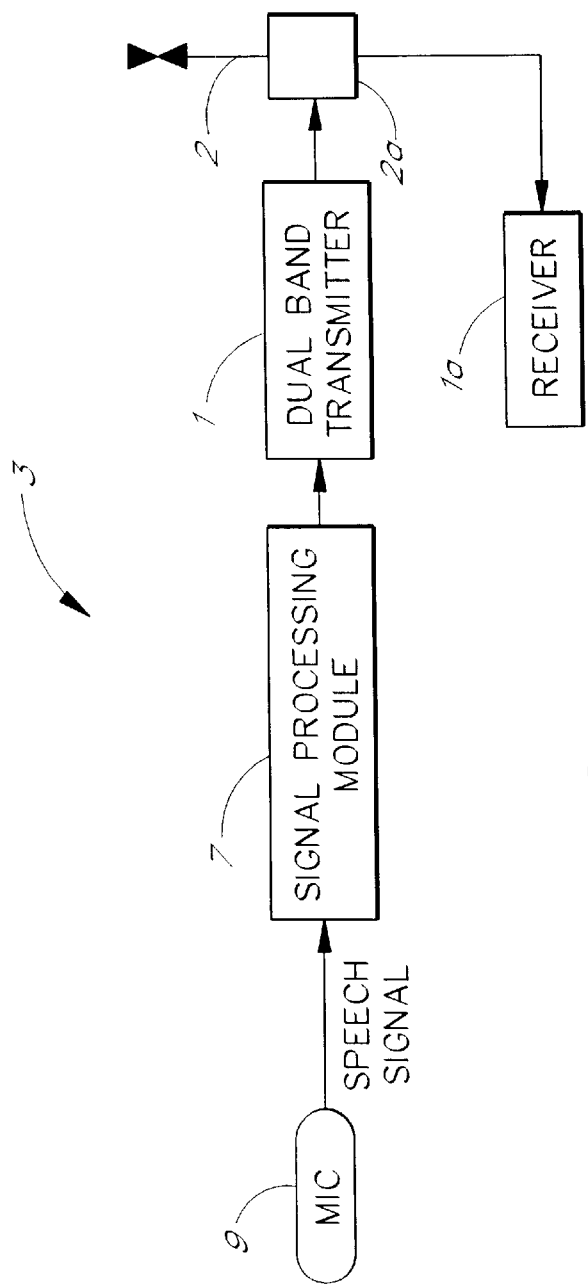
FIG. 2 is a simplified illustration of a transmit path of the cellular phone shown in FIG. 1.

FIG. 2 illustrates a simplified embodiment of the transmit path of the dual band cellular phone 3. The receive path is indicated by means of a receiver 1a which includes, for example, the radio frequency (RF) receiver. Within the cellular phone 3, the transmitter 1 including several amplifiers, and a processing module 7 are positioned on the motherboard and interconnected between the antenna 2 and a microphone 9 of the cellular phone 3. In this simplified illustration, the processing module 7 performs most speech and signal processing in a transmit direction, for example, voice encoding and channel encoding. The signal processing further includes a modulator to modulate an RF carrier of, for example, either 900 MHz or 1800 MHz with the processed speech signal. Alternatively, the dual band transmitter 1 can have a modulator to modulate the RF carrier with the processed speech signal.

Figure 3:
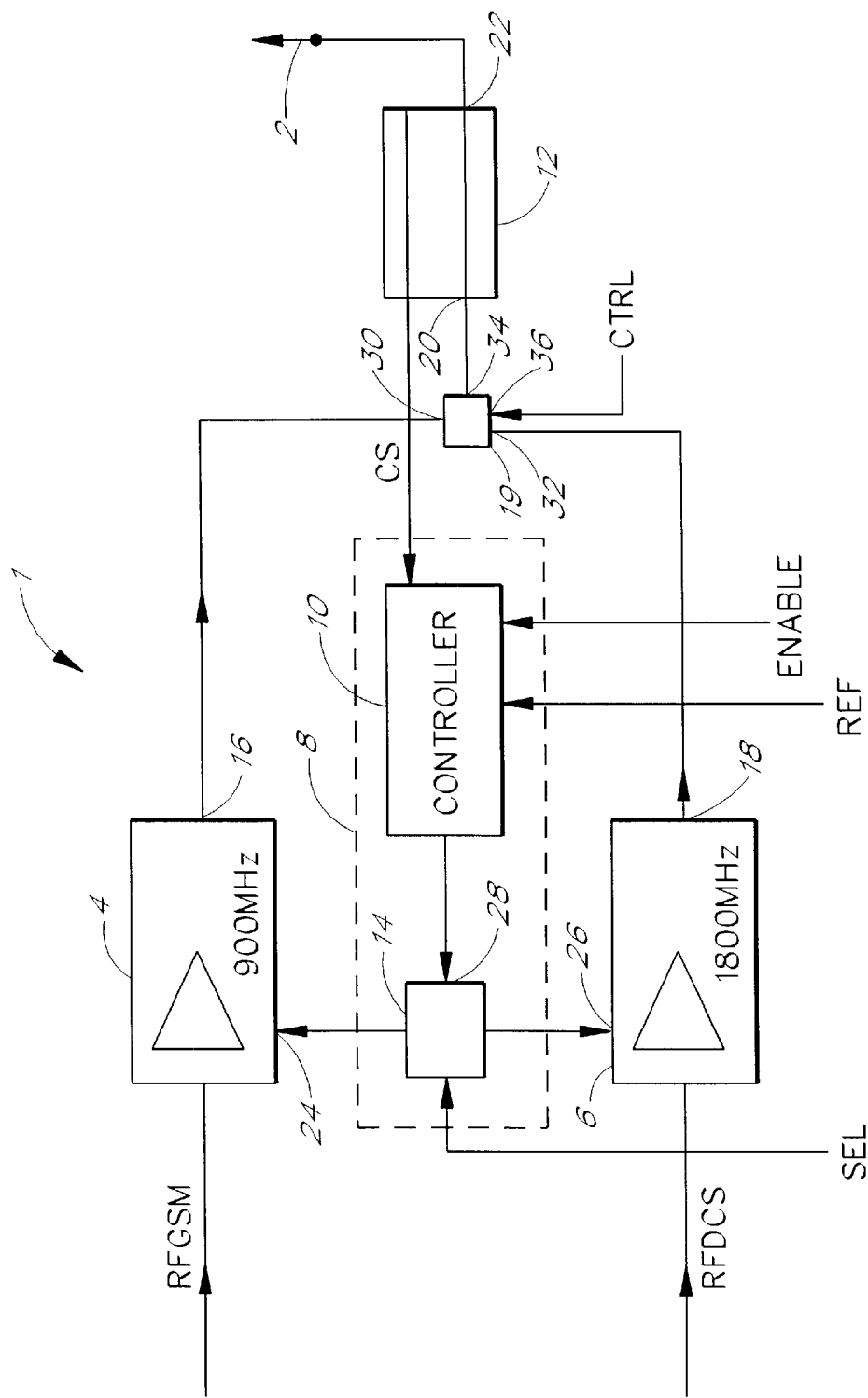
FIG. 3 is a schematic illustration of an embodiment of a dual band transmitted for a cellular phone made in accordance with the present invention.

FIG. 3 shows a simplified block diagram of the transmitter 1 shown in FIG. 2. The transmitter 1 includes two amplifiers 4, 6 connected to the antenna 2. In one embodiment, the amplifiers 4, 6 are power amplifiers which are optimized for amplifying signals in the radio frequency range. Hereinafter, the amplifiers 4, 6 are referred to as power amplifiers. However, it is contemplated that the invention generally can be used in connection with a variety of different types of amplifiers, and that the invention is not limited to applications using power amplifiers. The power amplifiers 4, 6 receive RF signals RFGSM, RFDCS from RF signal sources (not shown) located within the cellular phone 3. For instance, the RF signal sources may be included in the processing module 7 shown in FIG. 2. In one embodiment, the RF carrier has a frequency of 900 MHz or 1800 MHz depending on which RF carrier (GSM900 mode or DCS1800 mode) is chosen. Thus, the power amplifier 4 for the GSM900 mode operates at a frequency within a transmit frequency band between 890 MHz and 915 MHz, and the power amplifier 6 for the DCS1800 mode operates at a frequency within a transmit frequency band between 1710 MHz and 1785 MHz. Although the actual transmit frequencies of the power amplifiers 4, 6 can vary within the transmit frequency bands, the frequency of 900 MHz is typically referred to as the transmit frequency in the GSM900 mode, and correspondingly, the frequency of 1800 MHz is typically referred to as the transmit frequency in the DCS1800 mode.

The power amplifier 4 may advantageously be the same as a power amplifier device RF130 available from Rockwell Semiconductor Systems. The integrated amplifier circuit of the power amplifier device includes a three-stage amplifier with heterojunction bipolar transistors in Gallium Arsenide (GaAs) technology. The power amplifier 6 may advantageously be the same as a power amplifier device RF230 also available from Rockwell Semiconductor Systems. The integrated amplifier circuit of the power amplifier 6 also includes a three-stage amplifier with heterojunction bipolar transistors in Gallium Arsenide (GaAs) technology. Alternatively, the power amplifiers 4, 6 can be included in a multi-chip power amplifier module. Those skilled in the art will appreciate that other power amplifiers operating at these frequency bands can be used.

The power amplifier 4 receives the RF signal RFGSM, and the power amplifier 6 receives the RF signal RFDCS. However, those skilled in the art will appreciate that the power amplifiers 4, 6 can operate at another pair of frequency bands, for example, 900/1900 MHz. In such a dual band cellular phone only one power amplifier 4, 6 is active at a time.

Although the specific embodiments of the transmitter 1 are described with reference to a dual band cellular phone, it is contemplated that the invention is also applicable to cellular phones which can operate at more than two different frequency bands. These frequency bands may include those assigned for AMPS or PCS, or newly assigned frequency bands for mobile communications systems.

Which frequency band the cellular phone 3 uses to communicate with the base transceiver station is determined by external factors. That is, a user may deliberately set the cellular phone to operate in one of the two frequency bands depending on the mobile communications system (GSM900, DCS1800, GSM1900) the user chooses. Alternatively, the frequency band of the cellular phone 3 can be determined by the base transceiver station which currently serves the cellular phone 3. Depending on the current telephone traffic in the cell served by the base transceiver station, a dynamic change of the frequency band may be necessary to allow more telephone traffic. In, this case, the base transceiver station causes the cellular phone 3 to operate in one of the two frequency bands.

The transmitter 1 further includes a control module 8 which controls the power amplifiers 4, 6 so that, for example, the prescribed power level versus time profile as defined in the GSM standard (GSM 05.05) is achieved and maintained. The control module 8 monitors and controls the power amplifiers 4, 6 to ensure that an amplified RF signal output from an activated power amplifier 4, 6 conforms, for example, with the defined output power level versus time profile (GSM 05.05). The control module 8 compares the power of the RF signal fed to the antenna 2 with a reference signal and generates a control signal to control the active power amplifier 4, 6. Thereby, the active power amplifier 4, 6 and the controller form a feedback control loop, for example, a second order type-1 control loop.

For illustrative purposes, the control module 8 is shown as having a switch 14 and a controller 10. However, those skilled in the art will appreciate that the illustrated division of the control module 8 is random and that other divisions are possible. The switch 14, which is controllable through an electrical signal SEL, is connected to an input 24 of the power amplifier 4 and to an input 26 of the power amplifier 6. The control module 8 receives control signals and generates an output signal which is fed to an input 28 of the switch 14. The control signals which the control module 8 receives include a signal ENABLE, a reference signal REF and a coupled RF signal CS. Besides the signal from the controller 10, the switch 14 receives the control signal SEL which operates the switch 14 between a first and second switch state to allow control of either the power amplifier 4 or the power amplifier 6. Preferably, the switch 14 is an electronic switch such as a diode swith.

An output 16 of the power amplifier 4 is connected to a port 30 of a filter module 19 which is controllable through a control signal CTRL input at a port 36. The filter module 19 has a port 32 which is connected to an output 18 of the power amplifier 6, and a port 34 which is connected to an input 20 of an RF coupler 12. The filter module 19 is shown in greater detail in FIG. 4.

An output 22 of the RF coupler 12 is connected to the antenna 2. A connection to the receiver 1a (FIG. 1) is not shown in FIG. 3. Each power amplifier 4, 6 can be connected to the antenna 2 via the filter module 19, although the filter module 19 connects only one of the power amplifiers 4, 6 at a time to the RF coupler 12. Additionally, the filter module 19 prevents that an RF signal from an active power amplifier 4, 6 is fed to the output 16, 18 of the inactive power amplifier 4, 6.

The RF coupler 12, for example, is a directional coupler which couples a portion CS, for instance −25 dB of a GSM signal and −22 dB of a DCS signal, of the amplified RF signal out and inputs this coupled portion CS of the amplified RF signal to the controller 10. Therefore, when the power level of the amplified RF signal changes, the power level of the portion CS changes also. Advantageously, the RF coupler 12 is made of two adjacent microstrips. The first microstrip is part of a trace connecting, via the filter module 19, the power amplifiers 4, 6 and the antenna 2 and guiding the amplified RF signal. A portion of the amplified RF signal couples from the first microstrip to the second microstrip. This portion constitutes the coupled portion CS as stated above. The second microstrip guides the portion CS to the controller 10. The coupling efficiency of such an RF coupler 12 is determined by a spacing between the two microstrips and a length of the second microstrip with respect to the first microstrip. The second microstrip is on one end terminated with 50 ohms. At the end of the second microstrip, which is associated with the switch 19, a resistive attenuator and a filtering circuit are interposed between the coupler 12 and the controller 10. The attenuator and the filtering circuit adjust the power level and the frequency response of the coupler signal CS.

Figure 4:
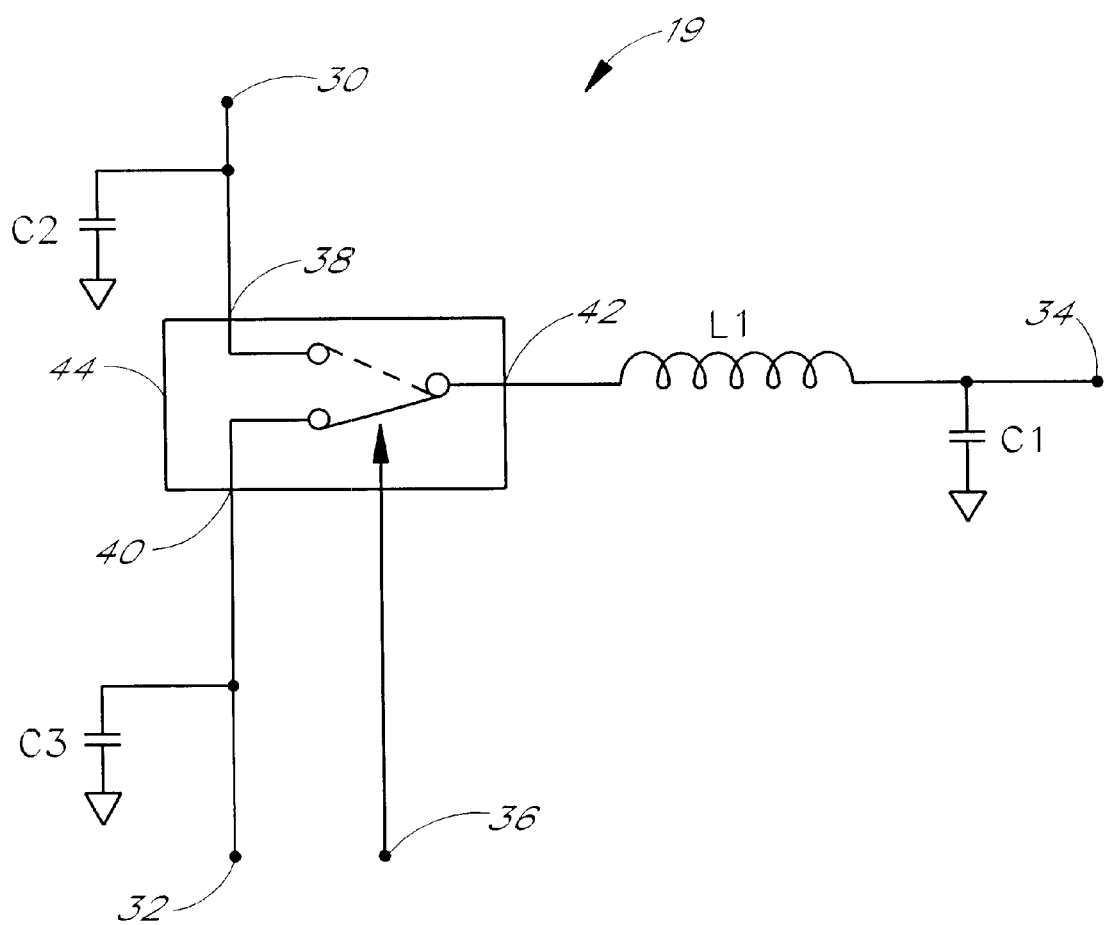
FIG. 4 is a schematic illustration of a controllable filter module.

FIG. 4 shows a schematic illustration of the controllable filter module 19. The filter module 19 comprises a switch 44 and a filter circuit. The switch 44 has a port 38 which is connected to the port 30 and a port 40 which is connected to the port 32. The control signal CTRL applied to the port 36 controls the switch 44 to connect a port 42 either to the port 38 or to the port 40. The filter circuit comprises a grounded capacitor C2 which is connected to the ports 30 and 38, a grounded capacitor C3 which is connected to the ports 32 and 40 and a combination of at least an inductor L1 and a capacitor C1. The inductor L1 is connected to the port 42, the grounded capacitor C1 and the port 34. In one embodiment, the switch 44 is a diode switch. Alternatively, similar components can be used which permit controlled switching between two states (ON/OFF), for example, GaAs switches. In one embodiment, the capacitors C1, C2, C3 have values of about 5 pF, 20 pF, 2 pF, respectively, and the inductor L1 has a value of about 3.9 nH.

As stated above, the frequency band which the cellular phone uses to communicate with the base transceiver station is usually determined by external factors. An internal central controller (not shown) of the cellular phone 3 selects the RF carrier and generates the control signal SEL depending on these external factors. The control signal SEL controls the switch 14 to connect the controller 10 to the power amplifier 4 or to the power amplifier 6. As soon as the controller 10 is connected to one of the power amplifiers 4, 6 the respective power amplifier 4, 6 is activated while the other power amplifier 4, 6 remains deactive or is deactivated.

At the same time, the central controller generates the signal CTRL to operate the switch 44 so that one of the power amplifiers 4, 6 is connected to the antenna 2. In case that the power amplifier 4 is connected to the antenna 2, the capacitor C2, the inductor L1 and the capacitor C1 form a first low pass filter. Correspondingly, in case that the power amplifier 6 is connected to the antenna 2, the capacitor C3, the inductor L1 and the capacitor C1 form a second low pass filter. The filter module 19 implements two low pass filters with a minimum amount of components. That is, the first and second low pass filters "share" the inductor L1 and the capacitor C1. The first and second low pass filters are of third order. Alternatively, filters can be of a higher order depending on what filter characteristic is desired.

In an other embodiment, the filter module 19 can include two bandpass filters which also share component. The bandpass filters can be selected to block all frequencies but the respective fundamental frequency.

Figure 5:
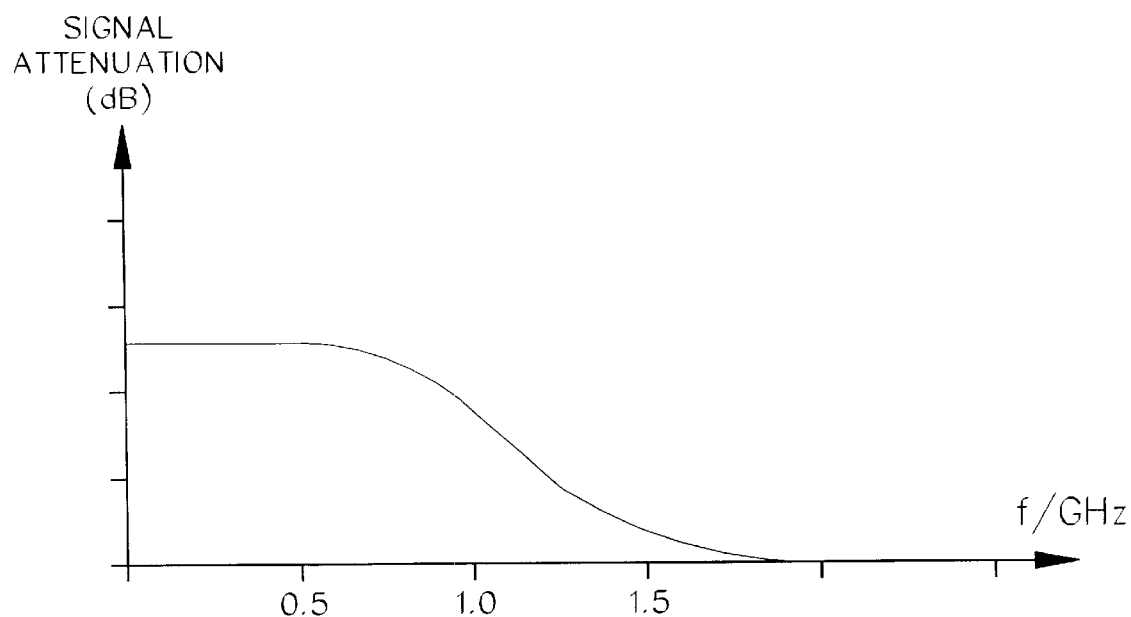
FIG. 5 is a filter characteristic of a first low pass filter for GSM mode.

The first and second low pass filters block undesired frequency components from the RF signal fed to the antenna 2. These undesired frequency components are harmonics of the fundamental, desired frequencies 900 MHz or 1800 MHz. For instance, the power amplifier 4 receives the signal RFGSM having a nominal frequency of 900 MHz, but outputs an RF signal having the fundamental frequency of 900 MHz and harmonics at, for example, 1800 MHz and 2700 MHz. The harmonic frequency at 1800 MHz falls into the frequency band of 1800 MHz which is the fundamental frequency for DCS. The first low pass filter is configured to have a filter characteristic as shown in FIG. 5 having a cut-off frequency of about 1 GHz. That is, harmonics above 1 GHz are blocked. Correspondingly, the power amplifier 6 receives the signal RFDCS having a nominal frequency of 1800 MHz, but outputs an RF signal having the fundamental frequency of 1800 MHz and harmonics at, for example, 3600 MHz and 5400 MHz. The second low pass filter is configured to have a filter characteristic as shown in FIG. 6 having a cut-off frequency of about 2 GHz.

Compared to known dual band cellular phones which have a complete low pass filter circuit for the 900 MHz signal and a complete low pass filter circuit for the 1800 MHz signal, the transmitter 1 of the present invention permits to reduce the components required for filtering the RF signal. By controlling the switch 19, either the capacitor C2 or the capacitor C1 are connected to the inductor L1 and the capacitor C1 to complete the low pass filter needed for the GSM mode or the DCS mode. That is, no duplication of the filters is required. Reducing the number of filter components results in less costs and additionally in smaller phones since less space is required for the filter circuit.

In the illustrated embodiment of the transmitter 1, the power amplifiers 4, 6 are controlled by a single control module 8. Thus, the power amplifiers 4, 6 share one control module 8 so that no duplication of control circuits is necessary resulting in cost savings for dual band cellular phones.

Figure 6:
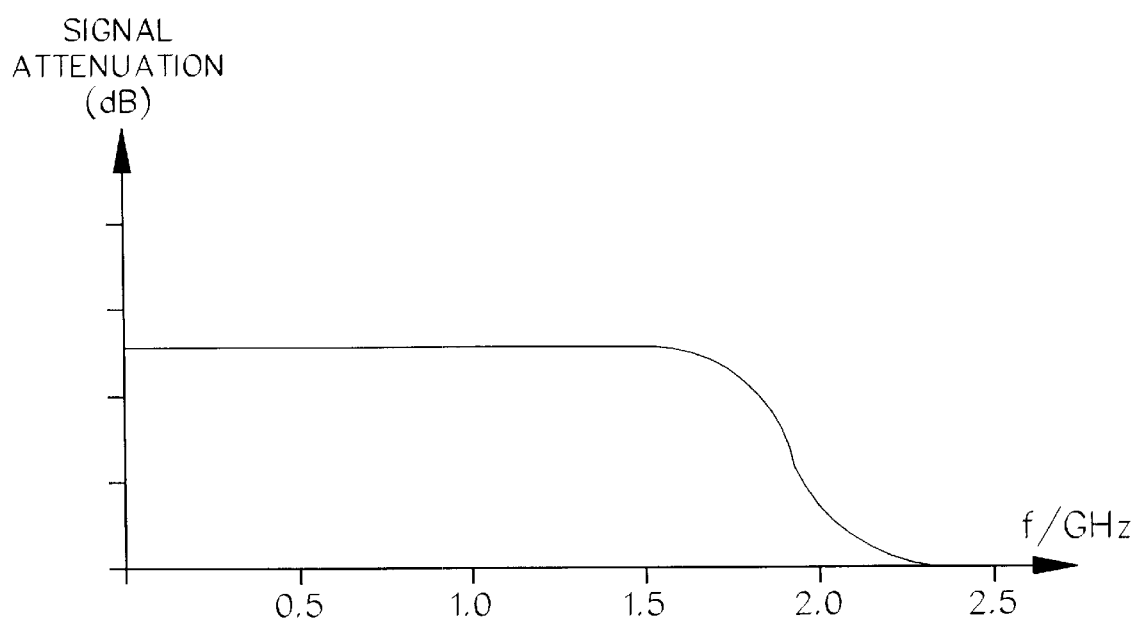
FIG. 6 is a filter characteristic of a second low pass filter for DCS mode.

FIGS. 5 and 6 generally show the filter characteristics implemented by the filter module. The filter characteristics qualitatively illustrate the signal attenuation in dB as a function of the frequency in GHz. FIGS. 5 and 6 show the filter characteristics of low pass filters Those skilled in the art will appreciate that the above described transmitter 1 and the filter module 19 included therein can be configured to operated at more than two frequency bands. In this case, the transmitter 1 can include more than two power amplifiers each optimized for a specific frequency band, and the filter module 19 can include more than two low pass filters each optimized for one of the specific frequency bands and configured to apply the same concept of sharing common elements and selectively adding desired elements by means of a switch to implement the desired filter characteristics.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A cellular phone for a mobile communications system, said phone being operable at a first radio frequency band and a second radio frequency band, said phone comprising a dual band transmitter and an antenna, said dual band transmitter comprising:

a first amplifier, said first amplifier having a first input for a first signal at said first radio frequency, and a first output for an amplified first signal, said first output being connectable to said antenna via a first signal path;

a second amplifier, said second amplifier having a second input for a second signal at said second radio frequency band and a second output for an amplified second signal, said second output being connectable to said antenna via a second signal path; and a filter module, said filter module being associated with the first and second signal paths and configured to receive a control signal which selectively operates the filter module at one of a first and second filter characteristics to selectively block undesired frequencies, wherein said first and second filter characteristics are selectable using shared filter components.

2. A wireless phone for a mobile communications system, said phone being operable at at least a first radio frequency band and a second radio frequency band said phone comprising a transmitter and an antenna, said transmitter comprising:

a first amplifier, said first amplifier having a first input for a first signal at said first radio frequency, and a first output for an amplified first signal, said first output being connectable to said antenna via a first signal path;

a second amplifier, said second amplifier having a second input for a second signal at said second radio frequency band and a second output for an amplified second signal, said second output being connectable to said antenna via a second signal path; and a filter module, said filter module being associated with the first and second signal paths and configured to receive a control signal which selectively operates the filter module at one of at least first and second filter characteristics to selectively block undesired frequencies, wherein said first and second filter characteristics are selectable using shared filter components.

3. The phone of claim 2, wherein said filter module comprises a filter circuit and a switch controllable by said control signal.

4. The phone of claim 3, wherein said filter circuit is configured to implement a first low pass filter when said switch is in a first switch state, and a second low pass filter when said switch is in a second switch state.

5. The phone of claim 4, wherein said shared filter components include a combination of at least a capacitor and an inductor, and wherein said switch selectively connects one of a first and second capacitors to said combination to form of said first and second low pass filters.

6. The phone of claim 5, wherein said first radio frequency band is between about 890 MHz and 915 MHz, and said second radio frequency band is between about 1710 MHz and 1785 MHz.

7. A transmitter for a wireless phone comprising an antenna and being operable at at least a first radio frequency band and a second radio frequency band, said transmitter comprising:

a first amplifier, said first amplifier having a first input for a first signal at said first radio frequency, and a first output for an amplified first signal, said first output being connectable to said antenna via a first signal path;

a second amplifier, said second amplifier having a second input for a second signal at said second radio frequency band and a second output for an amplified second signal, said second output being connectable to said antenna via a second signal path; and a filter module, said filter module being associated with the first and second signal paths and configured to receive a control signal which selectively operates the filter module at one of at least a first and second filter characteristics to selectively block undesired frequencies, wherein said first and second filter characteristics are selectable using shared filter components.

8. The transmitter of claim 7, wherein said filter module comprises a filter circuit and a switch controllable by said control signal.

9. The transmitter of claim 8, wherein said filter circuit is configured to implement a first low pass filter when said switch is in a first switch state, and a second low pass filter when said switch is in a second switch state, and wherein said first and second low pass filters share filter components.

10. The transmitter of claim 9, wherein said shared filter components include a combination of at least a capacitor and an inductor, and wherein said switch selectively connects one of a first and second capacitors to said combination to form of said first and second low pass filters.

11. The transmitter of claim 10, wherein said first radio frequency band is between about 890 MHz and 915 MHz, and said second radio frequency band is between about 1710 MHz and 1785 MHz.

12. The module of claim 9, wherein said shared filter components include a combination of at least a capacitor and an inductor, and wherein said switch selectively connects one of a first and second capacitors to said combination to form of said first and second low pass filters.

13. An amplifier module comprising:
a first amplifier, said first amplifier having a first input for a first signal at said first radio frequency, and a first output for an amplified first signal, said first output being connectable to said antenna via a first signal path;
a second amplifier, said second amplifier having a second input for a second signal at said second radio frequency band and a second output for an amplified second signal, said second output being connectable to said antenna via a second signal path; and
a filter module, said filter module being associated with the first and second signal paths and configured to receive a control signal which selectively operates the filter module at one of at least a first and second filter characteristics to selectively block undesired frequencies, wherein said first and second filter characteristics are selectable using shared filter components.

14. The module of claim 13, wherein said filter module comprises a filter circuit and a switch controllable by said control signal.

15. The module of claim 14, wherein said filter circuit is configured to implement a first low pass filter when said switch is in a first switch state, and a second low pass filter when said switch is in a second switch state, and wherein said first and second low pass filters share filter components.

16. A method for filtering radio frequency signals in a wireless phone, comprising the steps of:
providing a transmitter comprising a filter amplifier configured to amplify signals at a first frequency band, and a second amplifier configured to amplify signals at a second frequency band, said first and second amplifiers being coupled to an antenna;
activating one of said first and second amplifiers;
feeding a signal to said activated amplifier;
amplifying said signal with said activated amplifier;
feeding said amplified signal to a filter module, said filter module having at least two filter characteristics defined for said first and second frequency bands;
controlling said filter module to select one of said at least two filter characteristics implemented in said filter module, said selected filter characteristic blocking undesired frequencies outside a frequency band of said signal fed to the activated amplifier, wherein said filter characteristics are selectable using shared filter components; and
feeding said filtered signal to said antenna.

17. The method of claim 16, wherein the step of controlling said filter module includes operating a switch between at least a first and second state to selectively add at least one filter element to a combination of shared filter elements in order to selectively implement said at least two filter characteristics.

* * * * *